July 8, 1924.                                                1,500,815
J. H. HINMAN
BOILER BAFFLE AND METHOD OF CONSTRUCTING SAME
Filed Jan. 14, 1924
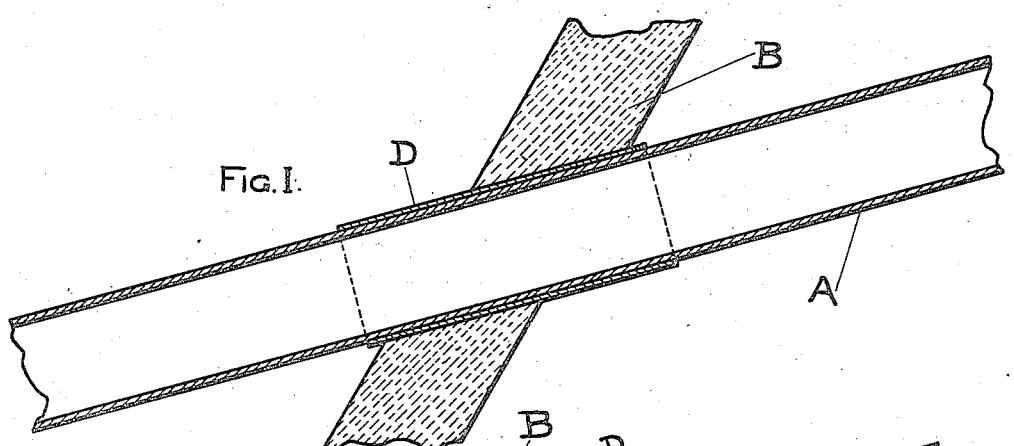
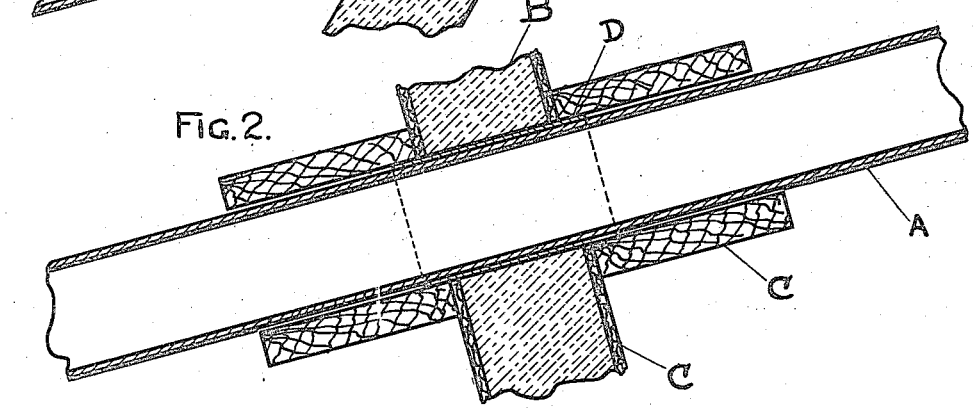
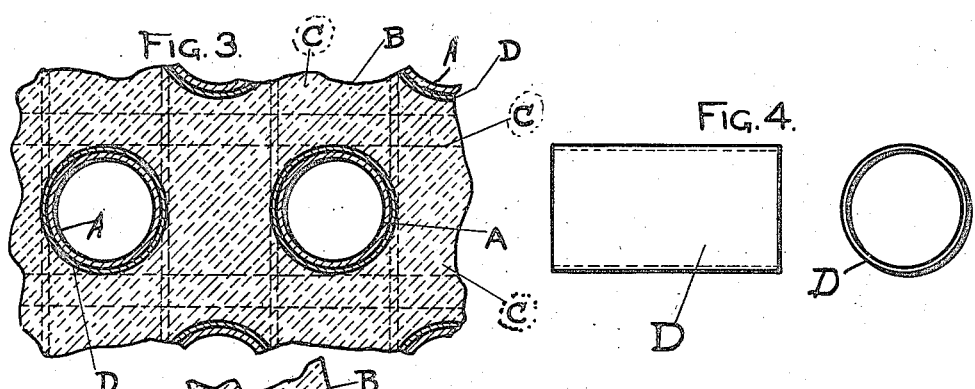
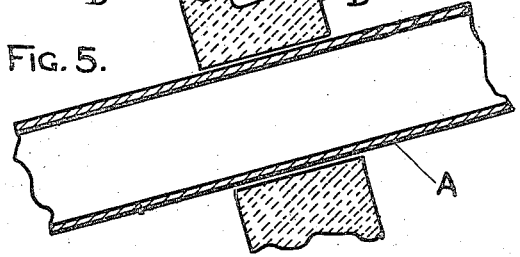
INVENTOR
JOHN H. HINMAN
BY
ATTORNEYS.

Patented July 8, 1924.

1,500,815

UNITED STATES PATENT OFFICE.

JOHN H. HINMAN, OF ST. LOUIS, MISSOURI, ASSIGNOR TO HEINE BOILER COMPANY, OF ST. LOUIS, MISSOURI, A CORPORATION OF MISSOURI.

BOILER BAFFLE AND METHOD OF CONSTRUCTING SAME.

Application filed January 14, 1924. Serial No. 686,217.

*To all whom it may concern:*

Be it known that I, JOHN H. HINMAN, a citizen of the United States, residing at St. Louis, Missouri, have invented a certain new and useful Improvement in Boiler Baffles and Methods of Constructing Same, of which the following is a full, clear, and exact description, such as will enable others skilled in the art to which it appertains to make and use the same.

This invention relates to baffles for water tube boilers, and particularly to baffles formed wholly or partly from a plastic or semi-plastic substance that is cast or molded around the water tubes, after they have been installed, so as to produce a partition or wall through which the water tubes extend.

In constructing boiler baffles of the general type referred to it is the usual practice to build a "wooden form" by arranging slats between the water tubes after said tubes have been combined with the headers, drums or water boxes of the boiler, and then fill said form with a special plastic fire clay mixture that subsequently hardens or dries, thus producing a molded wall in which the water tubes are imbedded. In some instances the wall is formed partly from tile and partly from plastic cement or the like that hardens after it has been incorporated in the wall, but whether the wall is formed wholly or partly from a plastic or semi-plastic substance, said substance contacts directly with the tubes of the boiler. Due to the fact that the substance from which the baffle is constructed is, in most instances, of such a nature that it will either contract in drying or hardening, or will expand only very slightly, the finished baffle will hug or grip the water tubes so tightly that the operation of removing a defective tube subjects the baffle to strains which frequently break or crack the baffle. Even if a tube is removed without serious damage to the baffle, the tube hole in the baffle is so nearly the size of the tube that it is generally impossible to insert the new tube in the baffle without further damage to the baffle. Also when the baffle mixture is of such a nature that it does not contract to such an extent as to grip the tubes tightly, the slight roughness on the exterior of the tubes which becomes imbedded in the baffle during the molding or casting operation tends to lock or key each tube in the baffle in such a way that a tube cannot be slipped endwise out of the baffle without subjecting the baffle to injurious strains. In addition to the difficulty of removing defective tubes and inserting new tubes, there is another very objectionable feature of molded, cast or poured baffles of the kind now in general use, namely, the tubes and baffle are connected together so rigidly that the "weaving," due to expansion and contraction of the whole boiler, sets up strains that tend to distort the baffle or tubes, or both the baffle and the tubes. A further objectionable characteristic of the conventional molded baffle is that vibration set up in the tubes by using a turbine or other similar cleaner to remove the scale from the interior of the tubes causes the baffle to crumble around the tubes, thus producing relatively large openings in the baffle surrounding the tubes through which the gases are apt to short-circuit when the boiler is in operation.

One object of my invention is to provide a molded or cast baffle for water tube boilers which is of such construction that it permits a defective tube to be removed or a new tube to be inserted without liability of cracking or injuring the baffle, due to strains exerted on the baffle by moving the tube endwise relatively to the baffle.

Another object is to provide a molded or cast baffle for water tube boilers which is combined with the tubes in such a way that the "weaving" of the boiler when it is in operation does not result in injury to the baffle or to the tubes.

Another object is to provide a molded or cast baffle for water tube boilers which is so constructed that the vibrations produced in the tubes by using a tool to remove scale from the interior of the tubes does not cause the baffle to crumble around the tubes.

And still another object is to provide a novel method of constructing a boiler baffle having the desirable characteristics above set forth.

Briefly described, my improved baffle consists of a wall or partition formed wholly or partly from a substance that is molded or cast around the water tubes of the boiler after they have been installed and equipped with holes or openings for the tubes which are of such size that the baffle surrounds the tubes closely enough to prevent short-circuiting of the gases, but does not grip the tubes tightly, thus permitting the tubes to move or be moved endwise with relation to the baffle without subjecting the baffle to injurious strains and preventing vibrations set up in the tubes from being transmitted to the portions of the baffle surrounding the tubes. Any suitable material that can be molded, cast or poured can be used in the construction of the baffle and various means can be used to prevent said material from gripping or clinging to the water tubes after said material has dried or hardened. The method that I have devised for constructing my improved baffle consists in casting or molding a suitable plastic or semi-plastic material around the water tubes after they have been combined with the headers, drums or water legs of the boiler and protecting the tubes from said material by a means that is removed after said material has set or hardened and which is of such a nature that the removal of same produces spaces or open joints around the tubes that are small enough to prevent short-circuiting of the gases, but large enough to permit endwise movement of the tubes without subjecting the baffle to injurious strains. Various means may be used to protect the tubes from the plastic or semi-plastic material used in the construction of the baffle, such as a coating of wax, tar or pitch on the exterior of the tubes located in the plane of the baffle and adapted to be destroyed by the heat or flame when the boiler is put in operation, or devices mounted upon or wrapped around the tubes in the plane of the baffle and formed from a combustible substance, such as paper or thin cardboard. Whatever means is used to protect the tubes it must be of such a character that it will serve as spacing devices between the tubes and the plastic or semi-plastic material during the molding, casting or pouring operation, and will be capable of being removed easily after said material has "set" or dried, so as to produce tube holes in the baffle that are of such diameter with relation to the external diameter of the tubes as to prevent the baffle from gripping, hugging or being rigidly connected with the tubes. I have herein illustrated my invention applied to a baffle formed entirely of material that is molded or cast around the tubes while in a plastic or semi-plastic state, and then allowed to harden or set, but I wish it to be understood that my invention is applicable to a baffle constructed partly of tile or the like and partly of material that can be molded or cast around the tubes.

Figure 1 of the drawings is a cross-sectional view of a boiler baffle constructed in accordance with my invention and combined with water tubes that are inclined relatively to the baffle.

Figure 2 is a cross-sectional view of a boiler baffle embodying my invention and combined with water tubes that are arranged at right angles to the baffle.

Figure 3 is an elevational view of a portion of my improved baffle, showing in cross section one means that can be used to prevent the material from which the baffle is formed from contacting with the exterior of the water tubes.

Figure 4 is a side elevational view and an end view of one form of spacing device that I have found to be very efficient in practicing my improved method of constructing boiler baffles; and Figure 5 is a view similar to Figure 2, showing how the baffle material is spaced away from the tubes after the protecting devices on the tubes have been destroyed.

In the drawings the reference character A designates the water tubes of a water tube boiler, and the reference character B designates a baffle through which said tubes extend. Said baffle is constructed of material that can be molded or cast around the tubes while in a plastic or semi-plastic state and then allowed to harden or dry so as to form a monolithic wall or partition that extends transversely of the tubes A of the boiler. Generally, the baffle is constructed of a special plastic fire clay mixture that is poured or tamped into a form C constructed of wooden lath that are arranged between the tubes A after they have been combined with the headers, water legs or drums of the boiler. In order to prevent the baffle B from gripping or hugging the tubes A after the material from which said baffle is constructed has hardened or "set," I provide the tubes A with a means that prevents the material of which the baffle is formed from contacting directly with the tubes in the pouring, casting or molding operation. Said means may consist of a coating on the exterior of the tubes A located in the plane of the baffle and formed from a plastic or semi-plastic substance such as wax, tar or pitch that can be applied to the tubes preparatory to the operation of casting or molding the baffle and which will be destroyed when the boiler is put in operation, or it may consist of easily combustible devices that are mounted upon or wrapped around the tubes in the plane of the baffle, preparatory to the molding or casting operation.

One means that I have found to be very efficient for carrying out my invention consists of tubular spacing devices D constructed of paper or light-weight cardboard and treated with paraffin or the like so as to render them water-proof. Said spacing devices D are made with their inside diameter a trifle larger than the outside diameter of the tubes A so that they can be easily slipped over the tubes prior to installing the tubes or combining the tubes with the headers, water legs or drums of the boiler, but it will, of course, be understood that it is immaterial when the spacing devices D are combined with the tubes, so long as they surround the tubes at the time the material from which the baffle is to be constructed is being cast or molded.

Assuming that tubular spacing devices D of easily combustible material are used, said devices are mounted on the tubes prior to the installation of the tubes in the boiler, the form C is then erected, the spacing devices D are then moved endwise of the tubes into alignment with the form C, and thereafter a suitable plastic or semi-plastic material is poured or tamped in the form C, so as to produce a wall or partition that extends transversely of the tubes A. When the boiler is put in operation after the material of which the baffle is constructed has "set" or hardened, the flames traveling through the boiler come in contact with the spacing devices D and destroy the same, thus leaving spaces or joints approximately equal to the thickness of the devices D between the tubes and the walls of the holes of the baffle through which said tubes extend. Owing to the fact that the baffle does not grip the tubes tightly, the tubes are free to move or be moved endwise relatively to the baffle without subjecting the baffle to strains tending to break or crack the baffle, and any vibration set up in the tubes during the operation of removing scale from the interior of the tubes will not be transmitted to the baffle, and accordingly, will have no tendency to cause the baffle to crumble around the tubes.

Having thus described my invention, what I claim as new and desire to secure by Letters Patent is:

1. In a water tube boiler, the combination of water tubes, and a baffle having molded or cast portions provided with openings for said tubes proportioned so as to permit the tubes to move endwise relatively to the baffle without subjecting the baffle to strains.

2. A boiler provided with water tubes, and a baffle having cast or molded portions through which said tubes extend, the outer surfaces of said tubes being separated from said baffle by spaces.

3. A boiler provided with water tubes, and a baffle comprising cast or molded material combined with said tubes in such a way that the tubes are free to move or be moved endwise relatively to the baffle without subjecting the baffle to destructive strains.

4. In a water tube boiler, the combination of water tubes, a baffle comprising cast or molded material through which said tubes extend, and means for preventing said material from clinging to or gripping said tubes after said material has dried or hardened.

5. A baffle for water tube boilers, consisting of a wall or partition comprising material that is cast or molded around the tubes of the boiler after they have been installed, and a combustible means interposed between the exterior of said tubes and said cast or molded material, for the purpose described.

6. A baffle for water tube boilers, consisting of a poured, cast or molded wall having openings for the tubes which are of such diameter with relation to the external diameter of the tubes that short-circuiting of the gases is prevented when the boiler is in operation and vibrations set up in the tubes or endwise movement of the tubes relatively to the baffle does not subject the baffle to destructive strains.

7. In a water tube boiler, the combination of water tubes, a baffle arranged transversely of said tubes and containing material that is cast or molded around the tubes, and a means adapted to be destroyed when the boiler is put into operation arranged in the plane of the baffle and interposed between the exterior of the tubes and said cast or molded material.

8. In a water tube boiler, the combination of water tubes, a baffle having molded openings through which said tubes extend, and liners for said openings that are adapted to be removed after the baffle has dried or hardened so as to form spaces between the baffle and the exterior of the tubes.

9. In a water tube boiler, the combination of water tubes, a baffle comprising material that is molded or cast around said tubes after they have been installed, and devices surrounding said tubes in the plane of said baffle and constructed from a substance that will prevent said cast or molded material from contacting with the tubes during the molding operation and which will be destroyed when the boiler is put into operation so as to form spaces between the baffle and the exterior of the tubes.

10. In a boiler, the combination of water tubes, a baffle having cast or molded portions through which said tubes extend, and tubular spacing devices on the tubes arranged in the plane of the baffle and constructed from paper or the like that is treated to render it waterproof.

11. A method of constructing a baffle for water tube boilers, characterized by casting or molding material around the tubes after they have been installed, and preventing said material from contacting directly with said tubes.

12. A method of constructing baffles for water tube boilers, characterized by casting or molding material around the tubes after they have been installed so as to form a wall or partition having holes through which the tubes extend, arranging spacing devices between the exterior of the tubes and said cast or molded material, and removing said spacing devices after said molded material has dried or hardened so as to permit the tubes to vibrate or move endwise relatively to the baffle without subjecting the baffle to destructive strains.

13. A method of constructing baffles for water tube boilers, characterized by arranging a protecting means on the portions of the exterior of the tubes of the boiler lying in the plane where the baffle is to be built, forming a wall having cast or molded portions in which said protecting means is imbedded, and removing said protecting means after said molded portions have "set" or hardened.

14. A method of constructing baffles for water tube boilers, characterized by casting or molding plastic or semi-plastic material around the tubes after they have been installed so as to form a wall or partition having molded portions through which the tubes extend, arranging a protecting means on the portions of the tubes lying in the plane of said wall so as to prevent said molded material from contacting with the tubes, and subsequently removing said protecting means so as to form spaces or joints between said wall and the portions of the tubes surrounded by said wall.

15. A method of constructing a baffle for water tube boilers, characterized by erecting a form at the point where the baffle is to be located after the tubes have been installed, filling said form with a plastic or semi-plastic material so as to produce a partition through which the tubes extend, arranging a protecting means on the portions of the tubes located inside of said form so as to prevent the material of which said partition is constructed from contacting with the tubes, and thereafter destroying said protecting means so as to produce spaces or joints between the baffle and the tubes.

JOHN H. HINMAN.